Figure 1:
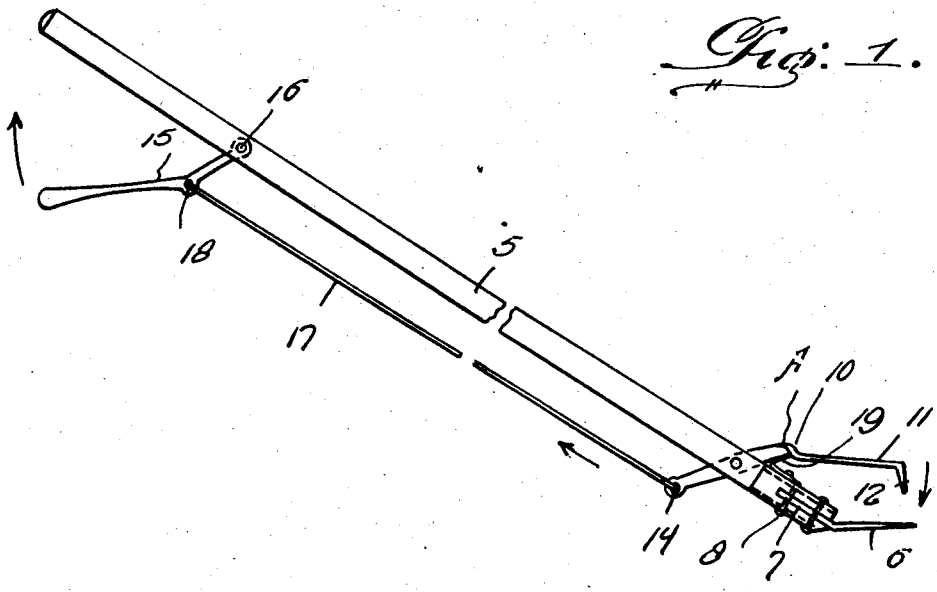

April 12, 1927.

R. B. STASTNY

DANDELION GRUBBER

Filed July 15, 1926

1,624,442

Inventor
R. B. Stastny.

By Clarence A. O'Brien

Attorney

Patented Apr. 12, 1927.

1,624,442

UNITED STATES PATENT OFFICE.

RUDOLPH B. STASTNY, OF WILBER, NEBRASKA.

DANDELION GRUBBER.

Application filed July 15, 1926. Serial No. 122,588.

The present invention relates to a dandelion grubber which is designed particularly for use in cutting dandelion roots even or a little below the ground level and includes a picking attachment whereby the dandelions may be easily picked up and gathered after having been cut down.

The important object of the invention lies in the provision of a device of this nature which is exceedingly simple in its construction strong and durable, compact and convenient, efficient and reliable in operation, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
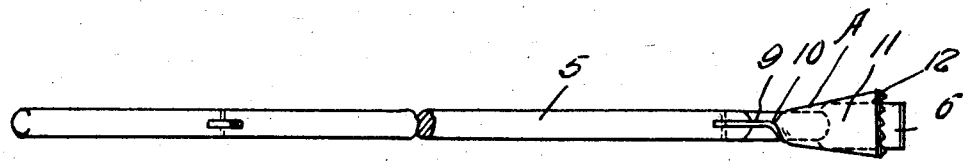
Figure 3:
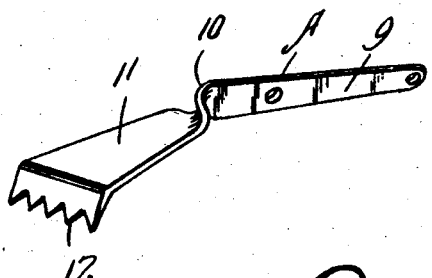

Figure 1 is a side elevation of the grubber embodying the features of my invention, Fig. 2 is a top plan view thereof, and Fig. 3 is a perspective view of the picker.

Referring to the drawing in detail, it will be seen that the numeral 5 denotes an elongated handle having a blade 6 provided with a shank 7 extending into one end of the handle, and held in place by rivets 8 or in any other suitable manner. The blade 6 extends at an obtuse angle to said handle 5.

A picker is indicated generally by the letter A and is of a one-piece structure including a shank 9 which is twisted at one end as at 10 and merges into a plate 11 which has its free extremities bent angularly and notched to form a rake 12. The other end of the shank 9 is provided with an eye indicated at 14. A lever 15 is pivoted at one end as at 16 to adjacent the other end of the handle 5 and a link rod 17 is pivotally engaged as at 18 with an intermediate portion of the lever 15 and extends into the aperture 14 of the shank 9 of the picker A.

A spring 19 of the leaf type is bent over upon itself and is attached to the handle to bear against the shank for normally holding the rake 12 a distance from the blade 6.

In using this device, it will be seen that the blade may be placed on the ground so as to be slid for severing the stem of a dandelion from the root and naturally the dandelion will fall over upon the blade and then the lever 15 may be actuated for bringing down the rake 12 to hold the dandelion on the blade so that it may be placed in any suitable receptacle without the necessity of being picked up by hand.

It will be seen that as soon as the lever 15 is released, the spring 19 will return the picker A to its original or normal position as is shown in Fig. 1.

It is thought that the construction, operation, and advantages of this invention will now be apparent to those skilled in this art without a more detailed description thereof. The present embodiment of the invention has been disclosed in detail merely by way of example since in actual practice it attains the features of advantage enumerated as desirable in the statement of the invention and the above description. It is apparent that the changes in the details of construction, and in the combination and arrangement of parts may be resorted to without departing from the spirit or scope of the invention as hereinafter claimed or sacrificing any of its advantages.

Having thus described my invention, what I claim as new is:—

A dandelion grubber of the class described including a handle, a blade having a shank extending at an obtuse angle therefrom and imbedded in one end of the handle and fixed thereto, a pinter formed from a single piece of material providing a straight shank piercing a slot in the handle adjacent the blade and pivoted intermediate its ends therein, one end of the straight shank being twisted to merge into a plate, said plate terminating in angularly extending teeth, means for swinging the straight shank and the plate for engaging the teeth thereof with the blade, a leaf spring bent over upon itself intermediate its ends, one end of the spring being fixed to the handle and the other end impinging against the straight shank to normally hold the plate and its teeth away from the blade.

In testimony whereof I affix my signature.

RUDOLPH B. STASTNY.